(12) United States Patent
Tanaka

(10) Patent No.: US 11,143,504 B2
(45) Date of Patent: Oct. 12, 2021

(54) IMAGE CAPTURE DEVICE AND IMAGE CAPTURE SYSTEM

(71) Applicant: SONY SEMICONDUCTOR SOLUTIONS CORPORATION, Kanagawa (JP)

(72) Inventor: Sachiya Tanaka, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 337 days.

(21) Appl. No.: 15/772,666

(22) PCT Filed: Sep. 28, 2016

(86) PCT No.: PCT/JP2016/078555
§ 371 (c)(1),
(2) Date: May 1, 2018

(87) PCT Pub. No.: WO2017/086027
PCT Pub. Date: May 26, 2017

(65) Prior Publication Data
US 2019/0154441 A1 May 23, 2019

(30) Foreign Application Priority Data
Nov. 16, 2015 (JP) .............................. JP2015-224023

(51) Int. Cl.
*G01C 3/06* (2006.01)
*G01C 3/14* (2006.01)
(Continued)

(52) U.S. Cl.
CPC .............. *G01C 3/06* (2013.01); *G01B 11/002* (2013.01); *G01B 11/026* (2013.01); *G01B 11/24* (2013.01);
(Continued)

(58) Field of Classification Search
CPC . G01C 3/06; G01C 3/085; G01C 3/08; H04N 5/23299; H04N 5/23218
See application file for complete search history.

(56) References Cited

U.S. PATENT DOCUMENTS 4,664,512 A * 5/1987 Shimizu ................. G01C 3/085
356/3.16
6,404,484 B1 * 6/2002 Sogawa ................. G01C 3/085
356/3.14

(Continued)

FOREIGN PATENT DOCUMENTS

CN    103780895 A    5/2014
CN    104272715 A    1/2015
(Continued)

OTHER PUBLICATIONS

International Search Report and Written Opinion of PCT Application No. PCT/JP2016/078555, dated Dec. 13, 2016, 09 pages of ISRWO.

(Continued)

*Primary Examiner* — Eric L Bolda
(74) *Attorney, Agent, or Firm* — Chip Law Group

(57) ABSTRACT

Both downsizing of a device and improvement of the ranging accuracy are implemented in a device for measuring a distance to an object. An image capture device includes a pair of imaging elements and a ranging unit. Regarding the pair of imaging elements in this image capture device, axes perpendicular to light receiving surfaces thereof cross each other. Furthermore, in the image capture device including the pair of imaging elements and the ranging unit, the ranging unit measures a distance to an object on the basis of a parallax obtained from a pair of images captured by the pair of imaging elements in which axes perpendicular to light receiving surfaces thereof cross each other.

4 Claims, 18 Drawing Sheets

(51) Int. Cl.
*H04N 5/232* (2006.01)
*G01B 11/00* (2006.01)
*G01B 11/02* (2006.01)
*G01B 11/24* (2006.01)

(52) U.S. Cl.
CPC ........... *G01C 3/14* (2013.01); *H04N 5/23218* (2018.08); *H04N 5/23219* (2013.01); *H04N 5/23299* (2018.08)

(56) References Cited

U.S. PATENT DOCUMENTS

| | | | | |
|---|---|---|---|---|
| 2004/0161072 | A1* | 8/2004 | Sjogren | B65H 43/00 377/7 |
| 2010/0183197 | A1* | 7/2010 | Aikawa | G01B 11/2545 382/106 |
| 2011/0242346 | A1* | 10/2011 | Ego | H04N 5/23245 348/222.1 |
| 2012/0236125 | A1* | 9/2012 | Umezawa | G01C 3/14 348/47 |
| 2013/0308011 | A1* | 11/2013 | Horikawa | H04N 5/232122 348/224.1 |
| 2015/0062305 | A1 | 3/2015 | Murayama et al. | |
| 2015/0103148 | A1* | 4/2015 | Masuda | G01B 11/022 348/47 |
| 2015/0124060 | A1 | 5/2015 | Hasegawa et al. | |

FOREIGN PATENT DOCUMENTS

| | | | | |
|---|---|---|---|---|
| EP | 1901034 | A2 * | 3/2008 | ............... G01C 1/02 |
| EP | 2846531 | A1 | 3/2015 | |
| JP | 4691508 | B2 | 6/2011 | |
| JP | 2013-217662 | A | 10/2013 | |
| JP | 5869106 | B2 | 2/2016 | |
| WO | 2013/146269 | A1 | 10/2013 | |
| WO | 2013/165006 | A1 | 11/2013 | |

OTHER PUBLICATIONS

Office Action for JP Patent Application No. 2017-551755 dated Sep. 15, 2020, 2 pages of Office Action and 2 pages of English Translation.

* cited by examiner

IMAGE CAPTURE DEVICE AND IMAGE CAPTURE SYSTEM

CROSS REFERENCE TO RELATED APPLICATIONS

This application is a U.S. National Phase of International Patent Application No. PCT/JP2016/078555 filed on Sep. 28, 2016, which claims priority benefit of Japanese Patent Application No. JP 2015-224023 filed in the Japan Patent Office on Nov. 16, 2015. Each of the above-referenced applications is hereby incorporated herein by reference in its entirety.

TECHNICAL FIELD

The present technology relates to an image capture device and an image capture system. More particularly, the present technology relates to an image capture device and an image capture system for measuring a distance to an object.

BACKGROUND ART

Conventionally, binocular image capture devices including a pair of imaging elements are used for imaging a stereoscopic image and other purposes. In a binocular image capture device, an image displacement amount is generated due to a parallax between an image obtained by one of a pair of imaging elements and an image obtained by the other. Since it is known that this image displacement amount varies depending on a distance to an object, the distance can be calculated from this image displacement amount. For example, an image capture device is proposed in which a pair of imaging elements are arranged such that optical axes perpendicular to respective light receiving surfaces are parallel to each other and a distance D to an object is measured from an image displacement amount Z using a predetermined relational expression (for example, see Patent Document 1). In this relational expression, the image displacement amount Z increases as an interval B (hereinafter referred to as "base line length") between a pair of Imaging elements increases and decreases as the distance D increases.

CITATION LIST

Patent Document

Patent Document 1: Japanese Patent No. 4691508

SUMMARY OF THE INVENTION

Problems to be Solved by the Invention

However, in the above-described conventional technique, as the distance D increases, the image displacement amount Z decreases, and there is a possibility that the ranging accuracy is deteriorated. As described above, increasing the base line length B results in relatively increasing the image displacement amount Z, thereby enabling improvement in the ranging accuracy. However, increasing the base line length B may disadvantageously increase the size of the device. In this manner, it is difficult to achieve both downsizing of a device and improvement in the ranging accuracy.

The present technology has been developed in view of such a situation and aims to achieve both downsizing of a device and improvement in the ranging accuracy in a device for measuring a distance to an object.

Solutions to Problems

The present technology has been devised in order to solve the above problems. A first aspect of the present invention is an image capture device including: a pair of imaging elements in which axes perpendicular to light receiving surfaces thereof cross each other; and a ranging unit for measuring a distance to an object on the basis of a parallax obtained from a pair of images captured by the pair of imaging elements. This results in an effect that a distance is measured on the basis of a parallax obtained from the pair of images.

In addition, in the first aspect, an imaging lens for condensing light and guiding the light to the pair of imaging elements may be further included. This results in an effect that a pair of images is captured by the pair of imaging lenses that receives light condensed by the one imaging lens.

Furthermore, in the first aspect, a pair of imaging lenses may be further included. One of the pair of imaging lenses may condense light and guide the light to one of the pair of imaging elements while the other one of the pair of imaging lenses condenses light and guides the light to the other one of the pair of imaging elements. This results in an effect that a pair of images is captured by the pair of imaging lenses that receives light condensed by the pair of imaging lenses.

Furthermore, in the first aspect, a lens barrel may be further be included, and the light receiving surface of one of the pair of imaging elements may be parallel to a bottom surface of the lens barrel. This results in an effect that images are captured by the pair of imaging elements, a light receiving surface of one of which is parallel to the bottom surface of the lens barrel.

Furthermore, in the first aspect, the ranging unit may measure the distance from an image displacement amount between one of the pair of images and the other. This results in an effect that the distance is measured from the image displacement amount.

Furthermore, in the first aspect, the ranging unit may measure the distance from a distortion amount of one of the pair of images from the other. This results in an effect that a distance is measured from a distortion amount of one of the pair of images from the other.

Furthermore, a second aspect of the present technology is an image capture system including: a pair of imaging elements in which axes perpendicular to light receiving surfaces thereof cross each other; a ranging unit for measuring a distance to an object on the basis of a parallax obtained from a pair of images captured by the pair of imaging elements; and a processing unit for performing processing of recognizing a shape of the object on the basis of the measured distance and the pair of images. This results in an effect that a distance is measured on the basis of a parallax obtained from the pair of images.

Effects of the Invention

According to the present technology, it is possible to achieve an excellent effect that both downsizing of a device and improvement of the ranging accuracy are implemented in a device for measuring a distance to an object. Note that effects described herein are not necessarily limited. Any one of the effects described in the present disclosure may be included.

MODE FOR CARRYING OUT THE INVENTION

Embodiments for carrying out the present technology (hereinafter referred to as "embodiments") will be described below. Descriptions will be given in the following order.

1. First embodiment (example of providing a pair of imaging elements optical axes of which cross)
2. Second embodiment (example of providing a pair of imaging elements optical axes of which cross in an optical system having one lens)
3. Third embodiment (example of arranging a camera module, including a pair of imaging elements optical axes of which cross, outside a device)

1. First Embodiment

[Configuration Example of Electronic Device]

Figure 1:
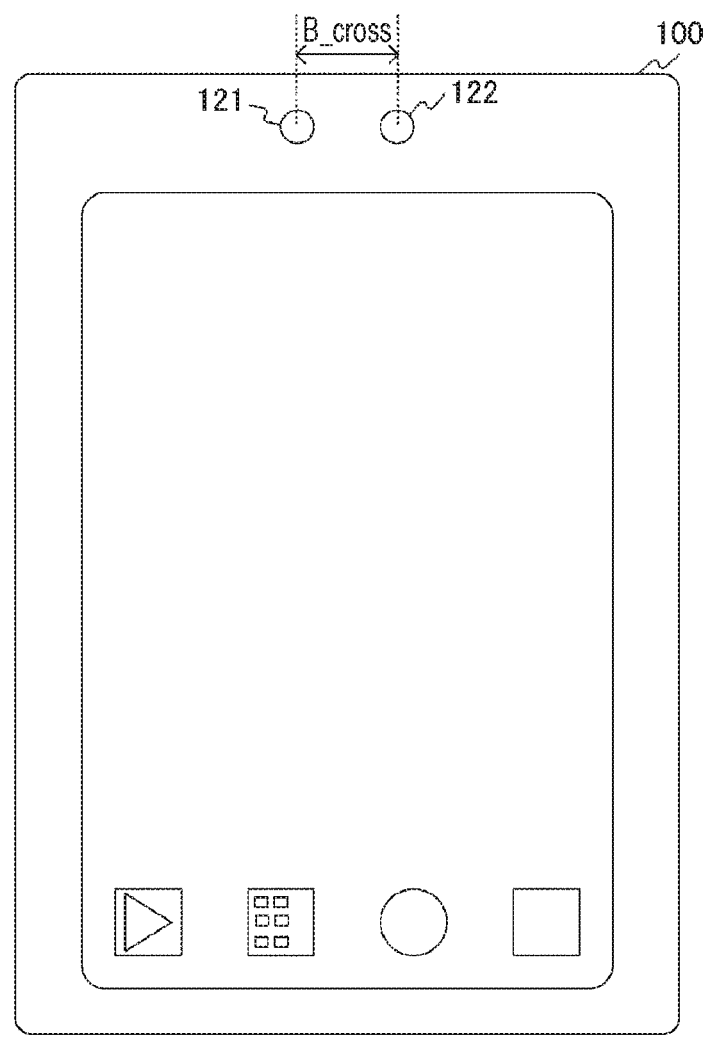
FIG. 1 is an example of an external view of an electronic device of a first embodiment of the present technology.

FIG. 1 is an example of an external view of an electronic device 100 of the first embodiment. As this electronic device 100, for example, a mobile device having an imaging function such as a smartphone or a tablet terminal is assumed. Standard lenses 121 and 122 are arranged on a front surface of the electronic device 100 where a display is included with a predetermined space therebetween. Note that the standard lenses 121 and 122 may be arranged not on the front surface of the electronic device 100 but on the back surface where a display is not included.

The standard lenses 121 and 122 condense light and guide the light to imaging elements. The angle of view of these lenses is less than or equal to a constant value (for example, 60 degrees).

Note that the standard lenses 121 and 122 are examples of imaging lenses described in the claims. Furthermore, the electronic device 100 is an example of an image capture device described in the claims.

Figure 2:
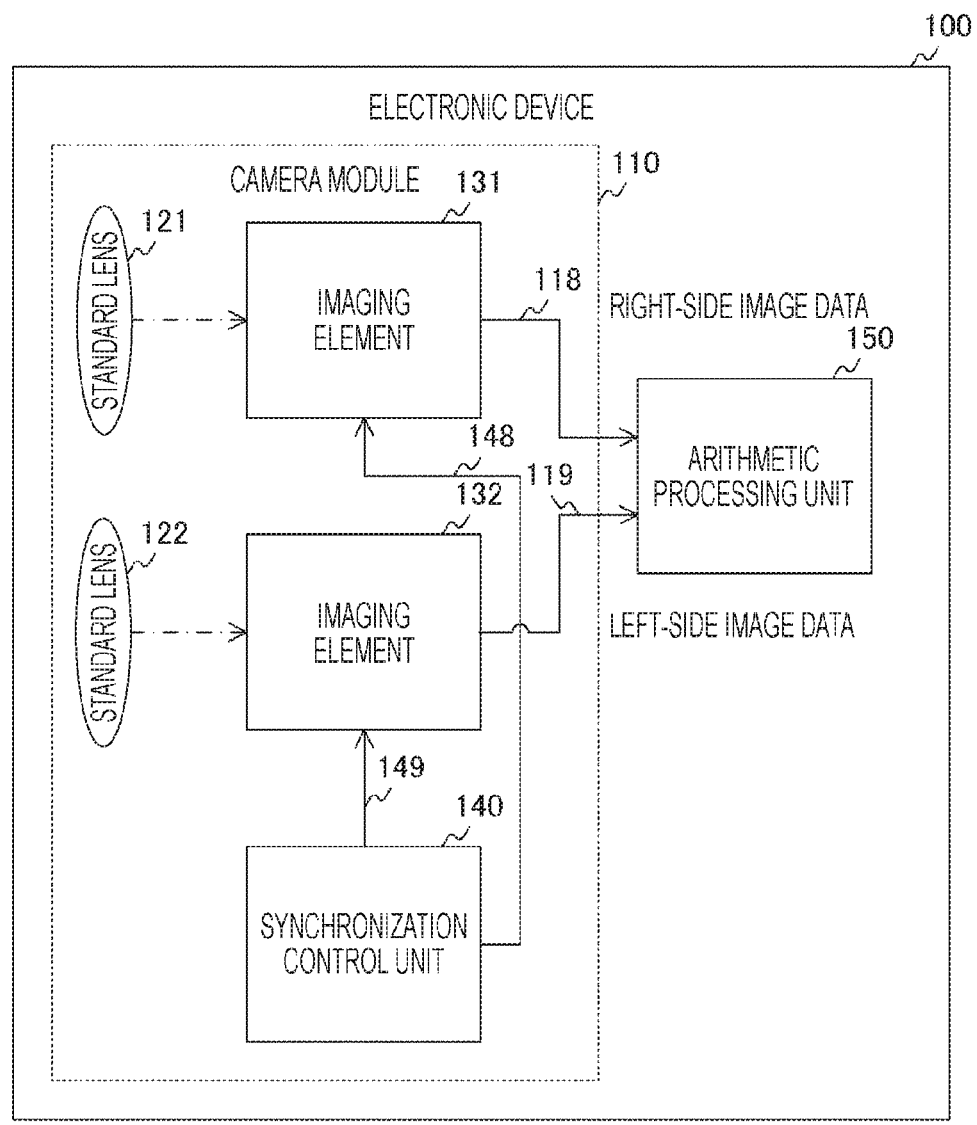
FIG. 2 is a block diagram illustrating a configuration example of the electronic device of the first embodiment of the present technology.

FIG. 2 is a block diagram illustrating a configuration example of the electronic device 100 of the first embodiment. The electronic device 100 includes a camera module 110 and an arithmetic processing unit 150. The camera module 110 includes the standard lenses 121 and 122, imaging elements 131 and 132, and a synchronization control unit 140.

The imaging element 131 photoelectrically converts light from the standard lens 121 to capture image data. The imaging element 132 photoelectrically converts light from the standard lens 122 to capture image data. These imaging elements each include a plurality of photoelectric conversion elements arrayed in a two-dimensional lattice shape on a light receiving surface. Furthermore, the imaging elements 131 and 132 are arranged such that optical axes perpendicular to the respective light receiving surfaces thereof cross. However, in FIG. 2, the respective optical axes are parallel for convenience of description unlike the actual implementation.

Here, the standard lens 121 and the imaging element 131 are arranged on a right side when viewed from the back surface of the electronic device 100, and the standard lens 122 and the imaging element 132 are arranged on a left side. The imaging element 131 supplies captured image data to the arithmetic processing unit 150 as right-side image data via a signal line 118. Meanwhile, the imaging element 132 supplies captured image data to the arithmetic processing unit 150 as left-side image data via a signal line 119. Each of the right-side image data and the left-side image data includes a plurality of pixels arrayed in a two-dimensional lattice shape.

The synchronization control unit 140 synchronizes imaging operations of the imaging elements 131 and 132. For example, when an application for performing gesture recognition is executed, the synchronization control unit 140 starts generation of a vertical synchronizing signal of a certain frequency. The synchronization control unit 140 transmits the vertical synchronizing signal to the imaging elements 131 and 132 via signal lines 148 and 149. Then, the imaging elements 131 and 132 perform imaging in synchronization with the common vertical synchronizing signal.

Note that, although the synchronization control unit 140 is arranged inside the camera module 110, the synchronization control unit 140 may be arranged outside the camera module 110. Furthermore, in the case where imaging of only a stationary object is assumed, the synchronization control unit 140 may not be included. Note that, although the standard lenses 121 and 122 and the imaging elements 131 and 132 are arranged in the same camera module, the standard lenses 121 and 122 and the imaging elements 131 and 132 may be arranged while distributed to a plurality of modules. For example, the standard lens 121 and the imaging element 131 may be arranged in a right side camera module, and the standard lens 122 and the imaging element 132 may be arranged in a left side camera module.

The arithmetic processing unit 150 performs predetermined arithmetic processing on the basis of the left-side image data and the right-side image data. This arithmetic processing includes processing of measuring a distance from an image displacement amount between the left-side image data and the right-side image data.

Note that the electronic device 100 performs ranging on the basis of data obtained by the imaging elements 131 and 132 in which photoelectric conversion elements are arrayed in a two-dimensional lattice shape. However, ranging may be performed on the basis of data obtained by a pair of imaging elements in which photoelectric conversion elements are arranged linearly. An imaging element in which photoelectric conversion elements are linearly arranged in this manner is also referred to as a linear image sensor. In the case of providing a pair of linear image sensors, the imaging elements 131 and 132 may not be included or may be included separately from the linear image sensors.

Configuration Example of Arithmetic Processing Unit

Figure 3:
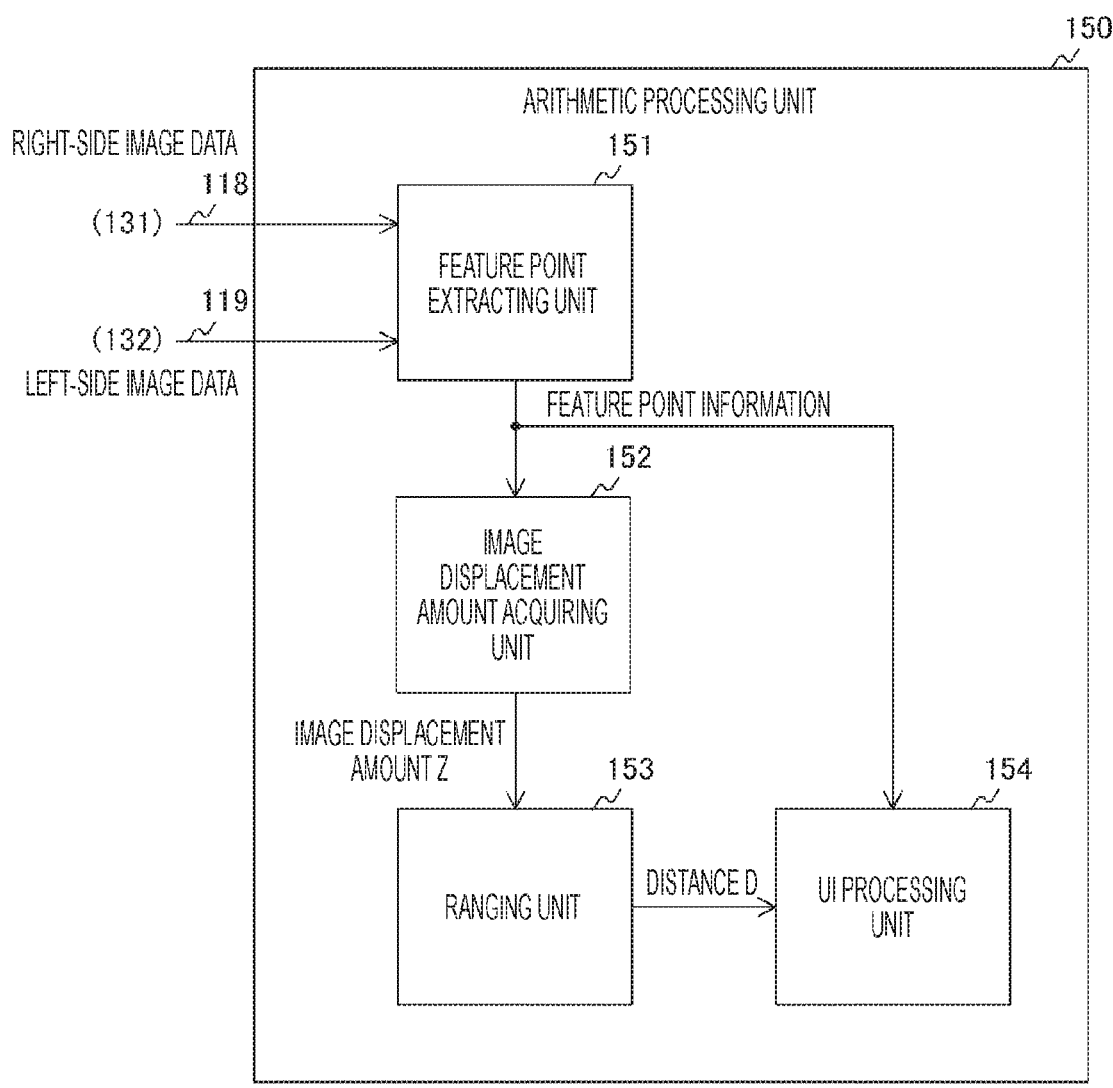
FIG. 3 is a block diagram illustrating a configuration example of an arithmetic processing unit of the first embodiment of the present technology.

FIG. 3 is a block diagram illustrating a configuration example of the arithmetic processing unit 150 of the first embodiment. The arithmetic processing unit 150 includes a feature point extracting unit 151, an image displacement amount acquiring unit 152, a ranging unit 153, and a user interface (UI) processing unit 154.

The feature point extracting unit 151 extracts feature points in each of the left-side image data and the right-side image data. Here, a feature point means a part where the color or the luminance greatly changes such as an intersection (corner) of an edge.

As an algorithm for extracting feature points, for example, one described in Yasushi KANAZAWA, et al. (2004) "Computer vision no tameno gazou no tokuchouten no chusyutsu", Journal of the Institute of Electronics, Information and Communication Engineers Vol. 87, No. 12 is used. In this algorithm, a Harris operator is extracted as a feature point by a combination of first-order differentiation and Gaussian smoothing. Alternatively, a Moravec operator that directly evaluates variance in each direction of a luminance value is extracted as a feature point. Alternatively, a feature point is extracted by smallest univalue segment assimilating nucleus (SUSAN) operator which counts the number of pixels larger than or equal to any threshold value in a circular mask using the mask. Note that an algorithm different from the above may be used as long as feature points can be extracted.

The feature point extracting unit 151 generates feature point information, which includes a coordinate of a feature point in an image and identification information for identifying the feature point for each feature point, for each of the left-side image data and the right-side image data and supplies the feature point information to the image displacement amount acquiring unit 152 and the UI processing unit 154.

The image displacement amount acquiring unit 152 acquires an image displacement amount between the left-side image data and the right-side image data on the basis of the feature point information. For example with respect to at least one of feature points in the left-side image data, the image displacement amount acquiring unit 152 obtains a feature point in the right-side image data corresponding to the feature point.

Upon obtaining the corresponding feature point (in other words, performing matching), the image displacement amount acquiring unit 152 obtains, for each feature point, a feature amount of a region of a certain shape (such as a circle) centered at the feature point and associates feature points having similarity of a feature amount higher than a certain value, for example. For example, a vector indicating a direction of a luminance gradient is obtained as a feature amount. Note that the image displacement amount acquiring unit 152 may perform image matching using an algorithm other than this method.

Then, the image displacement amount acquiring unit 152 calculates a distance (such as Euclidean distance) between corresponding feature points for each pair of corresponding feature points as the image displacement amount Z and supplies the distance to the ranging unit 153.

The ranging unit 153 measures the distance D from the image displacement amount Z for each feature point. The ranging unit 153 supplies the measured distance D to the UI processing unit 154. Note that, although the image displacement amount acquiring unit 152 calculates the distance D only for feature points, the distance D may be calculated for all pixels.

The UI processing unit 154 performs input processing related to a user interface on the basis of a coordinate and the distance D of each feature point. For example, the UI processing unit 154 recognizes the shape of a human body from a coordinate and the distance D of each feature point and detects the shape or temporal change of the shape as a gesture. The UI processing unit 154 executes input processing corresponding to the detected gesture. For example, swiping processing of moving (swiping) a screen is associated in advance with a gesture of "waving the right hand to the left and right", and the UI processing unit 154 performs the swiping processing upon recognizing the gesture. Note that the UI processing unit 154 is an example of the processing unit described in the claims.

In addition, although the arithmetic processing unit 150 obtains the image displacement amount Z from the matched feature point; however, the image displacement amount Z may be obtained by another method. The image displacement amount acquiring unit 152 may obtain the image displacement amount Z by using, for example, a phase only correlation (POC) method using Fourier transform. In a case where the POC method is used, it is unnecessary to extract feature points in ranging.

Moreover, the arithmetic processing unit 150 uses the distance D in UI processing; however, the distance D may be used for other processing. For example, the distance D may be used for auto focus (AF) processing or generation processing of a depth map.

Configuration Example of Optical System

Figure 4:
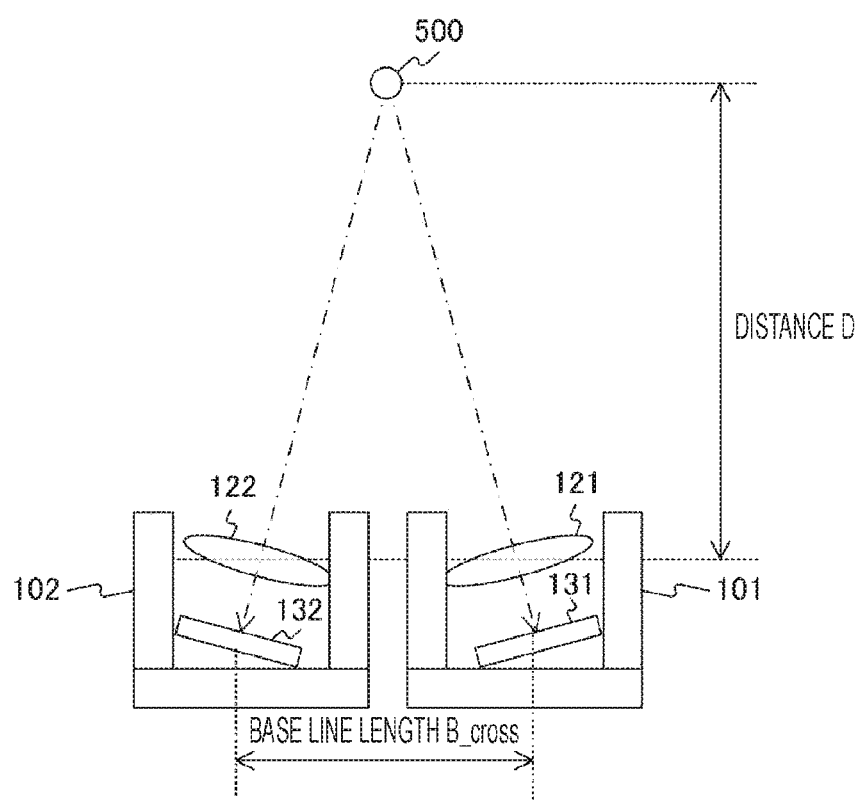
FIG. 4 is a top view illustrating a configuration example of an optical system of the first embodiment of the present technology.

FIG. 4 is a top view illustrating a configuration example of an optical system of the first embodiment. This optical system includes the standard lenses 121 and 122, the imaging elements 131 and 132, and lens barrels 101 and 102. In the lens barrel 101, the standard lens 121 and the imaging element 131 are arranged, and the standard lens 122 and the imaging element 132 are arranged in the lens barrel 102. This figure is a top view of the optical system when viewed from a predetermined direction parallel to the display surface of the electronic device 100.

The standard lens 121 is arranged such that a lens surface thereof is substantially parallel to the light receiving surface of the imaging element 131. Moreover, the standard lens 122 is arranged such that a lens surface thereof is substantially parallel to the light receiving surface of the imaging element 132.

Furthermore, the imaging elements 131 and 132 are arranged such that optical axes perpendicular to the respective light receiving surfaces thereof cross. For example, the imaging element 131 is arranged such that the bottom surface of the lens barrel 101 and the light receiving surface of the imaging element 131 form a predetermined angle, and the imaging element 132 such that the bottom surface of the lens barrel 102 and the light receiving surface of the imaging element 132 form a predetermined angle.

Furthermore, the position of a representative point (for example, the center of a light receiving surface) of each of the imaging elements 131 and 132 is desirably equivalent in a direction perpendicular to the surface of the display (hereinafter referred to as "depth direction").

Furthermore, the distance between respective representative points of the imaging elements 131 and 132 in a direction perpendicular to the depth direction is regarded as a base line length B_cross. An angle when a certain object 500 is viewed from each of the imaging elements 131 and 132 arranged at an interval of the base line length B_cross is different between the left side imaging element 132 and the right side imaging element 131. The difference in angle is called a parallax. The image displacement amount Z is generated by this parallax. The image displacement amount Z (parallax) varies depending on the distance D from the standard lenses 121 and 122 to the predetermined object 500 in the depth direction. Therefore, the distance D can be derived from the image displacement amount Z. Generally, the following relational expression holds between the image displacement amount Z obtained from the pair of imaging elements having the base line length B and the distance D.

$$D = f \times B / Z \qquad \text{Mathematical formula 1}$$

In the above mathematical formula, f denotes the focal distance of the standard lenses 121 and 122. In addition, a unit of the distance D, the focal distance f, and the base line length B is, for example, a meter (m).

Figure 5A:
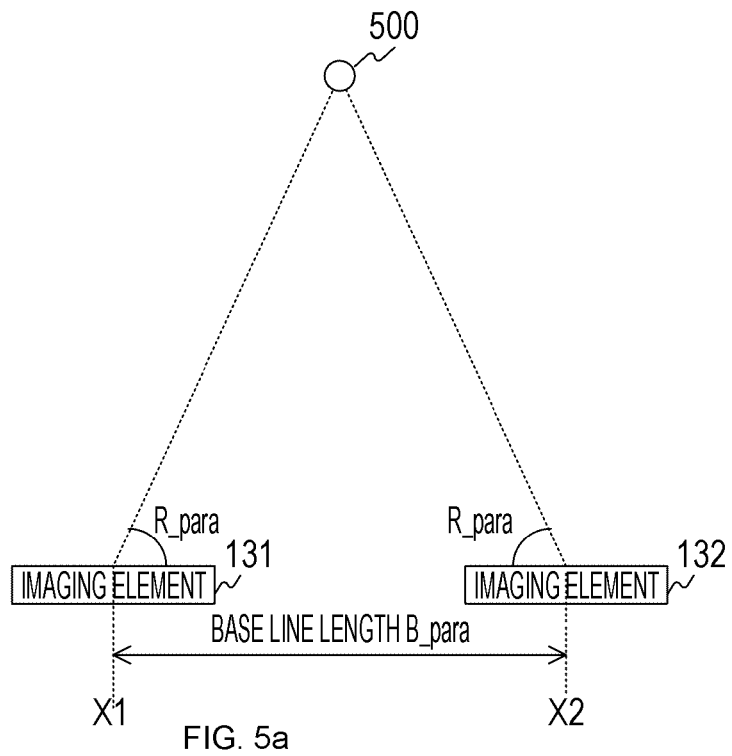
FIGS. 5a and 5b include diagrams for explaining a relationship between inclination of a lens and a parallax in the first embodiment of the present technology.
Figure 5B:
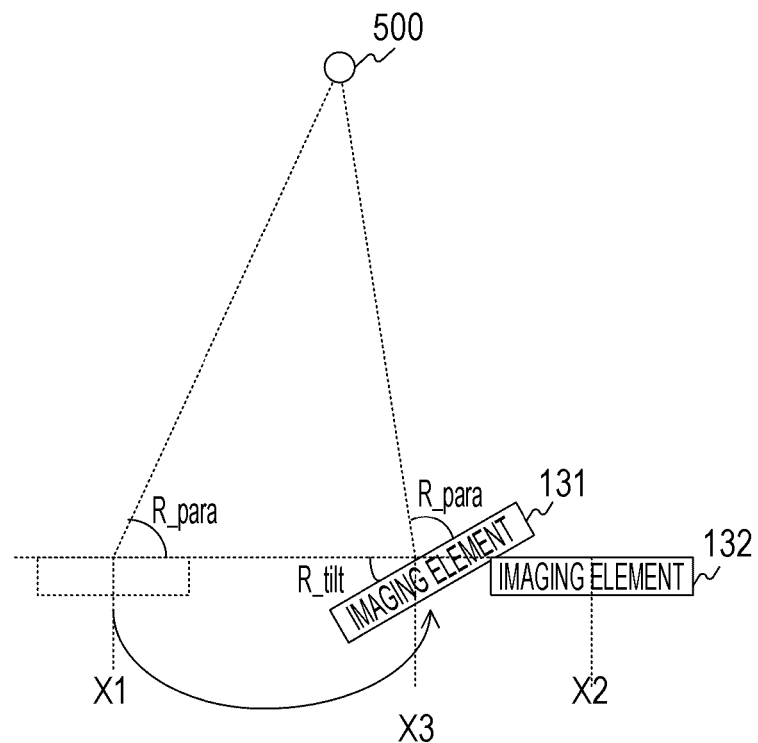

FIGS. 5a and 5b include diagrams for explaining a relationship between inclination of a lens and a parallax in the first embodiment. FIG. 5a is a top view of an optical system of a comparative example in which the imaging elements 131 and 132 are arranged such that optical axes thereof are parallel to each other. With this configuration, a distance between a central coordinate X1 of the imaging element 131 and a central coordinate X2 of the imaging element 132 in a direction perpendicular to the depth direction is regarded as a base line length B_para. The base line length B_para is assumed to be longer than the base line length B_cross. Furthermore, the angle formed by the light receiving surface and a linear line connecting a certain object 500 and the center of the imaging element 131 (in other words, the angle when the object is viewed from the imaging element 131) is denoted as R_para.

FIG. 5b is a top view of the optical system in a case where the imaging element 131 is tilted. It is assumed that the light receiving surface of the imaging element 131 is tilted by a tilt angle R_tilt with respect to the direction perpendicular to the depth direction. It is further assumed that the tilted imaging element 131 is parallelly translated toward the imaging element 132, and that an angle of the object 500 when viewed from the imaging element 131 at a certain position X3 is R_para. Since the angle of the object 500 when viewed from the imaging element 131 at this position X3 is the same as that before the tilting, the same image as that in a in the figure is formed on the imaging element 131.

Figure 6:
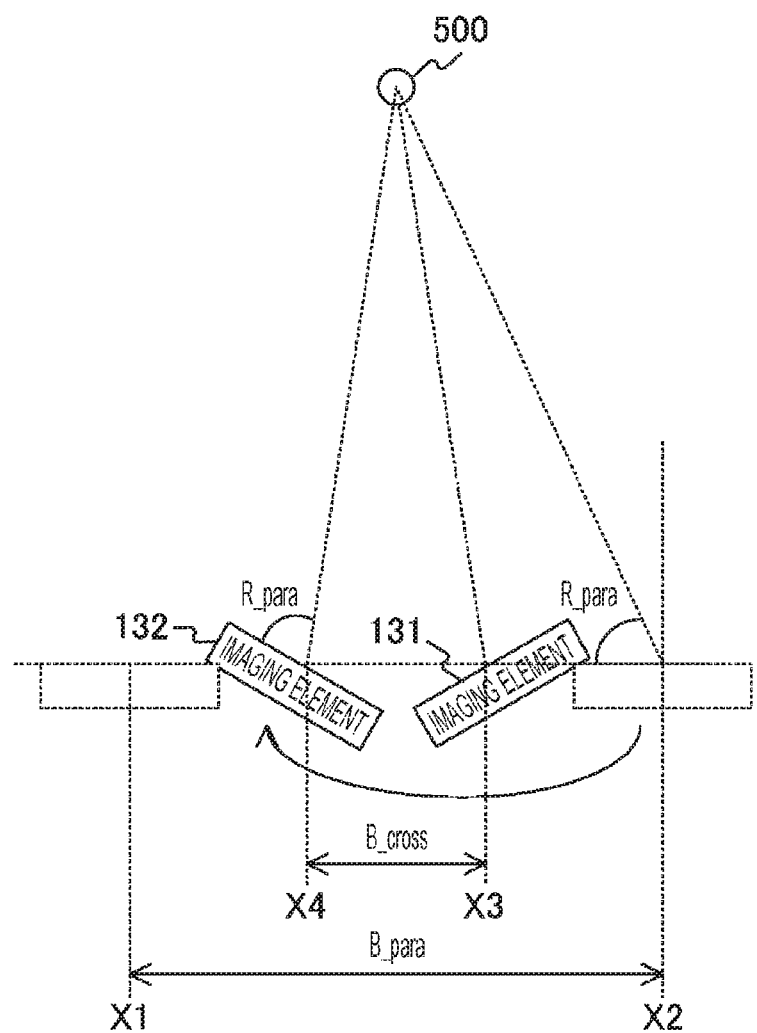
FIG. 6 is a diagram for explaining a method of calculating a distance from a parallax in the first embodiment of the present technology.

FIG. 6 is a diagram for explaining a method of calculating a distance from a parallax in the first embodiment. It is assumed that the imaging element 132 is further tilted by the tilt angle R_tilt in a direction opposite to that of the imaging element 131 in the state of FIG. 5b and parallelly translated in a direction opposite to the imaging element 131 by the same distance as that of the imaging element 131. Since the angle of the object 500 when viewed from the imaging element 132 is the same as that before the tilting at this position X4, the same image as that before the tilting in FIGS. 5a and 5b is formed on the imaging element 132. This distance between X3 and X4 after the tilting is regarded as a base line length B_cross. Since the same image as that before the tilting is formed on the imaging elements 131 and 132 even though the base line length B_cross is shorter than the base line length B_para, the image displacement amount Z is the same as that before the tilting. Since the image displacement amount Z is the same, the ranging accuracy is equivalent between a case of not tilting the imaging elements 131 and 132 and a case of tilting.

In this manner, tilting the imaging elements 131 and 132 and allowing the optical axes to cross enables the base line length to be shortened without deteriorating the ranging accuracy. This allows the electronic device 100 to be downsized. Furthermore, if the imaging elements 131 and 132 are arranged such that the optical axes are parallel to each other while the base line length B_cross is maintained, the image displacement amount Z becomes small, and the ranging accuracy is deteriorated. That is, allowing the optical axes of the imaging elements 131 and 132 to cross enables the image displacement amount Z to be multiplied by B_para/B_cross without changing the base line length as compared with the case where the optical axes are parallel. As a result, the ranging accuracy can be improved. In this manner, it is possible to achieve both downsizing of the electronic device 100 and improvement of the ranging accuracy.

The base line length B_para can be calculated from the tilt angle R_tilt and the base line length B_cross using a trigonometric function. The ranging unit 153 calculates the distance D using the following mathematical formula obtained by applying the previously calculated base line length B_para to the mathematical formula 1.

$$D = f \times B\_para / Z \qquad \text{Mathematical formula 2}$$

Figure 7A:
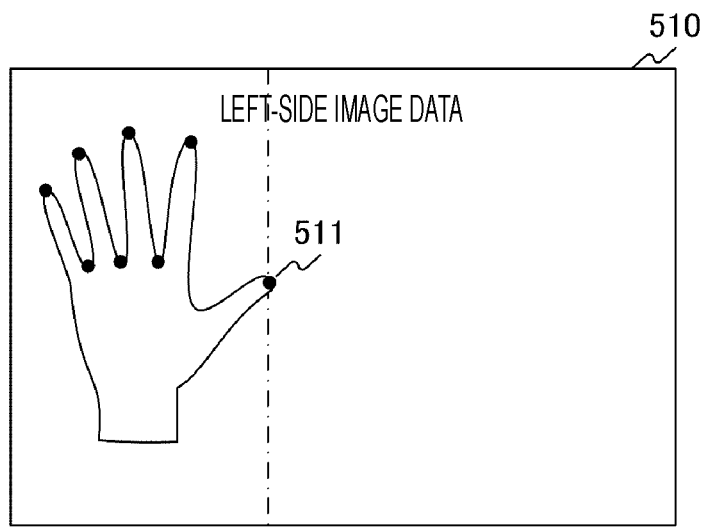
FIGS. 7a and 7b include diagrams illustrating an example of a left-side image data and a right-side image data in the first embodiment of the present technology.
Figure 7B:
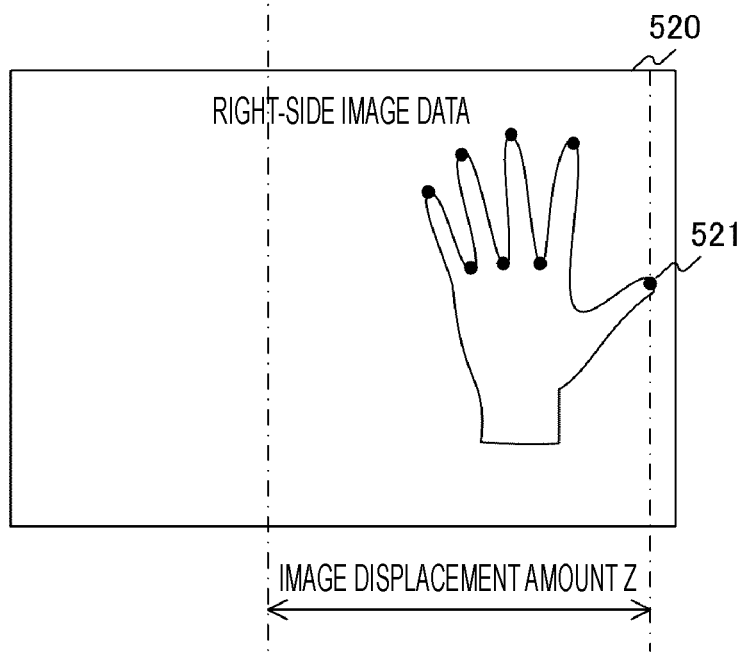

FIGS. 7a and 7b include diagrams illustrating an example of a left-side image data and a right-side image data in the first embodiment. FIG. 7a is an example of the left-side image data 510, and b in the figure is an example of the right-side image data 520. A black point in the image data represents a feature point.

The feature point extracting unit 151 extracts a feature point 511 and other points in the left-side image data 510 and extracts a feature point 521 and other points in the right-side image data 520. Then, the image displacement amount acquiring unit 152 performs matching of feature points. For example, the feature point 511 in the left-side image data is associated with the feature point 521 in the right-side image data. The image displacement amount acquiring unit 152 acquires a distance between the corresponding pair of feature points as the image displacement amount Z.

Figure 8A:
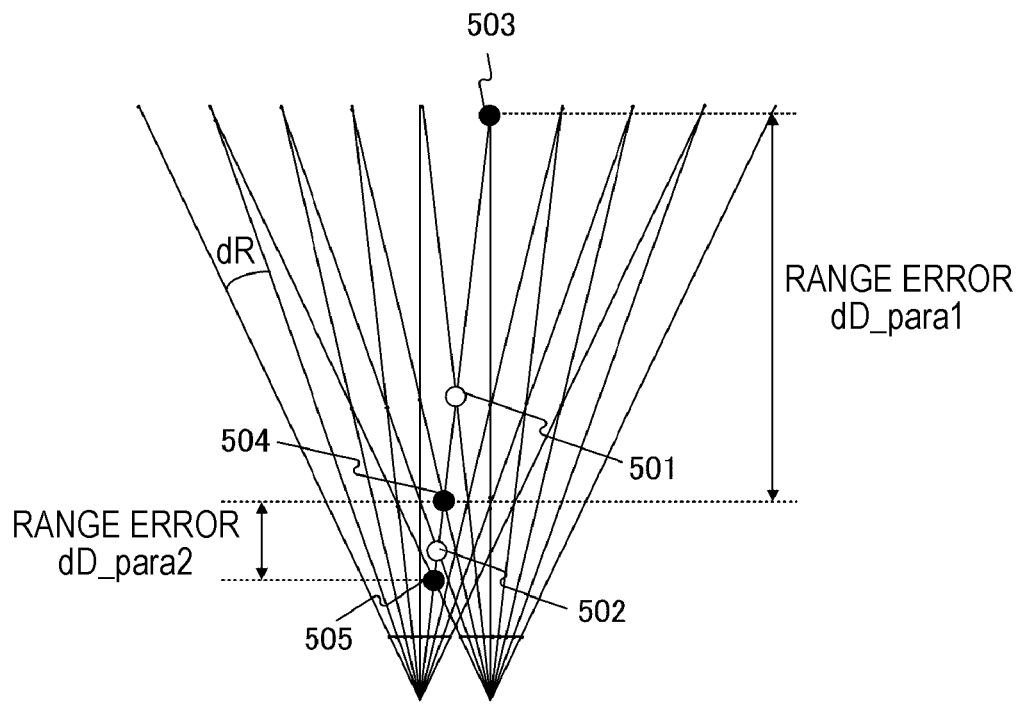
FIGS. 8a and 8b include diagrams for explaining a range error in the first embodiment of the present technology.
Figure 8B:
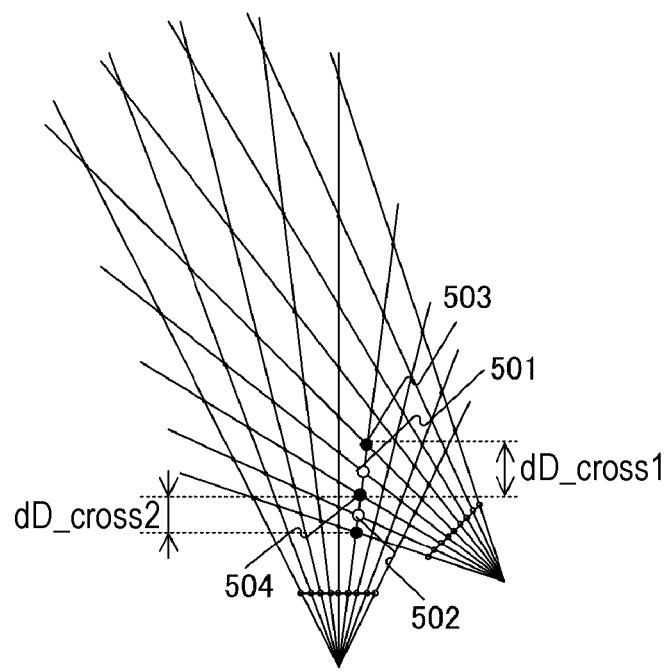

FIGS. 8a and 8b include diagrams for explaining a range error in the first embodiment. FIG. 8a is a diagram illustrating an example of a range error in a comparative example in which the pair of imaging elements are arranged such that the optical axes thereof are parallel. In the figure, a solid line in a radial form indicates an optical path of light incident on an imaging element. An angle formed by each optical path and the light receiving surface is assumed to be different from each other by dR. In addition, white dots 501 and 502 indicate an object to be measured. Assuming that, when the white dot 501 is measured, a change in a parallax of about an angle ±dR when viewed from one of the imaging elements does not result in a substantial change in the image displacement amount Z, a range error corresponding to this ±dR is generated. For example, a range error dD_para1 from a black dot 503 corresponding to the angle+dR to a black dot 504 corresponding to the angle-dR is generated. Also with respect to the white dot 502, a range error dD_para2 is generated.

FIG. 8b is a diagram illustrating an example of a range error in the optical system in which the imaging elements 131 and 132 in which the optical axes cross are arranged. It is assumed that positions of the white dots 501 and 502 are the same as those in a in the figure. In a case where the optical axes cross, a distance between a black dot 503 corresponding to the angle+dR and a black dot 504 corresponding to the angle —dR becomes closer as exemplified in b in the figure, and thus a range error at the time of ranging a white dot 501 decreases from dD_para1 to dD_cross1. A range error at the time of ranging the white dot 502 also decreases from dD_para2 to dD_cross2. By allowing the optical axes to cross in this manner, the ranging accuracy is improved as compared with the configuration without crossing.

Operation Example of Electronic Device

Figure 9:
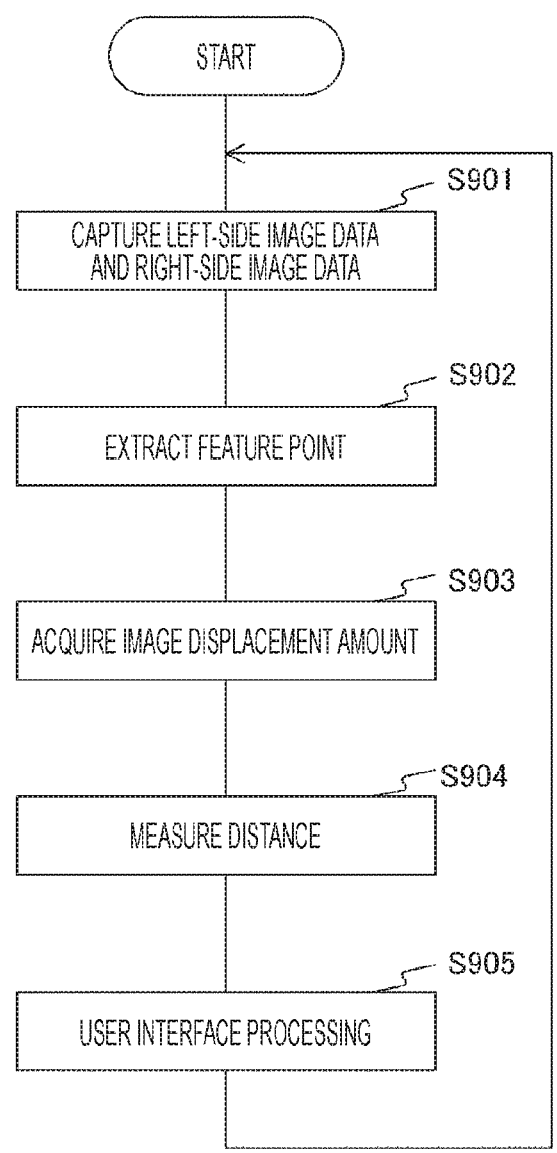
FIG. 9 is a flowchart illustrating an example of the operation of the electronic device of the first embodiment of the present technology.

FIG. 9 is a flowchart illustrating an example of the operation of the electronic device 100 of the first embodiment. This operation starts, for example, when a predetermined application for performing the user interface processing is executed.

The electronic device 100 captures left-side image data and right-side image data (step S901) and extracts feature points in the image data (step S902). The electronic device 100 performs matching of the feature points and acquires a distance between a corresponding pair of feature points as an image displacement amount Z (step S903). Then, the electronic device 100 measures the distance D using mathematical formula 2 from the image displacement amount Z (step S904). The electronic device 100 performs a user interface processing on the basis of the obtained distance D and coordinates of the feature points (step S905). After step S905, the electronic device 100 repeatedly executes step S901 and the following steps.

As described above, since the imaging elements 131 and 132 are arranged such that the optical axes thereof cross according to the first embodiment of the present technology, the image displacement amount can be increased as compared to the configuration in which the optical axes are arranged to be parallel. As a result, the ranging accuracy can be improved. Moreover, since the base line length can be reduced without deteriorating the ranging accuracy, the device can be downsized.

[First Variation]

In the first embodiment described above, both of the imaging elements 131 and 132 are tilted with respect to the bottom surfaces of the lens barrels 101 and 102, respectively. However, for tilted arrangement, it is necessary to provide a support member or other members for supporting the tilted imaging element between the lens barrel and the imaging element, which may disadvantageously increase the number of parts. Furthermore, there is a possibility that positional displacement may occur upon arrangement by tilting. An electronic device 100 of a first variation of the first embodiment is different from the first embodiment in that an increase in the number of parts of an optical system or positional displacement is suppressed.

Figure 10:
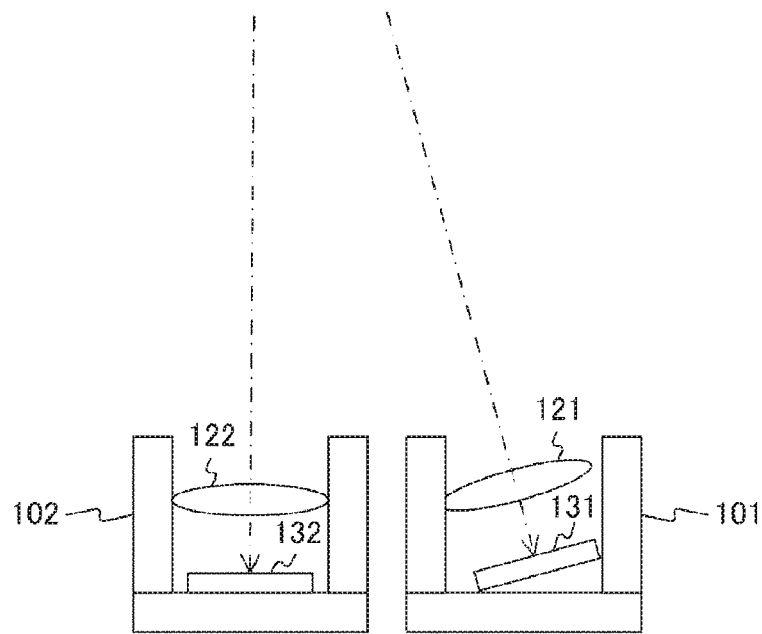
FIG. 10 is a top view illustrating a configuration example of an optical system of a first variation of the first embodiment of the present technology.

FIG. 10 is a top view illustrating a configuration example of an optical system of a first variation of the first embodiment. The optical system of the first variation is different from the first embodiment in that the standard lens 122 and the imaging element 132 are arranged such that the lens surface of the standard lens 122 and the light receiving surface of the imaging element 132 are parallel to the bottom surface of the lens barrel 102. As a result, no support member is necessary for the imaging element 132, and thus an increase in the number of parts of the optical system can be suppressed. Moreover, occurrence of positional displacement of the imaging element 132 can be suppressed. Furthermore, the imaging element 132 arranged in parallel to the bottom surface of the lens barrel 102 can be used also as a main camera for capturing video or still images. For example, when a moving image or a still image is captured without performing ranging, it is enough to use only the imaging element 132.

As described above, since a light receiving surface of one of the pair of imaging elements is arranged so as to be parallel to the bottom surface of the lens barrel 102 according to the first variation of the first embodiment of the present technology, an increase in the number of parts of the optical system or positional displacement can be suppressed.

[Second Variation]

In the first embodiment described above, the image displacement amount Z is relatively increased by tilting the imaging elements 131 and 132. However, even if the image displacement amount Z is increased, the ranging accuracy may be disadvantageously insufficient in a case where the distance D is long. Here, it is known that, in a wide angle lens having a relatively large angle of view, a phenomenon (distortion aberration) that an image is distorted in a peripheral portion and other portions of image data as compared with an actual shape. The distortion amount of the same object due to the distortion aberration may be different between left-side image data and right-side image data. This is because the shape changes when a three-dimensional object is viewed from different angles. Since this distortion amount increases as a distance to an object becomes closer, the distance can be measured from the distortion amount. Even in a case where the image displacement amount Z is almost zero, if an object is three-dimensional, there may be a difference in the distortion amount between left-side image data and right-side image data due to a parallax, and thus the ranging accuracy can be improved by considering this distortion amount (parallax). The electronic device 100 of the second variation of the first embodiment is different from the first embodiment in that the ranging accuracy is improved by using the distortion amount.

Figure 11:
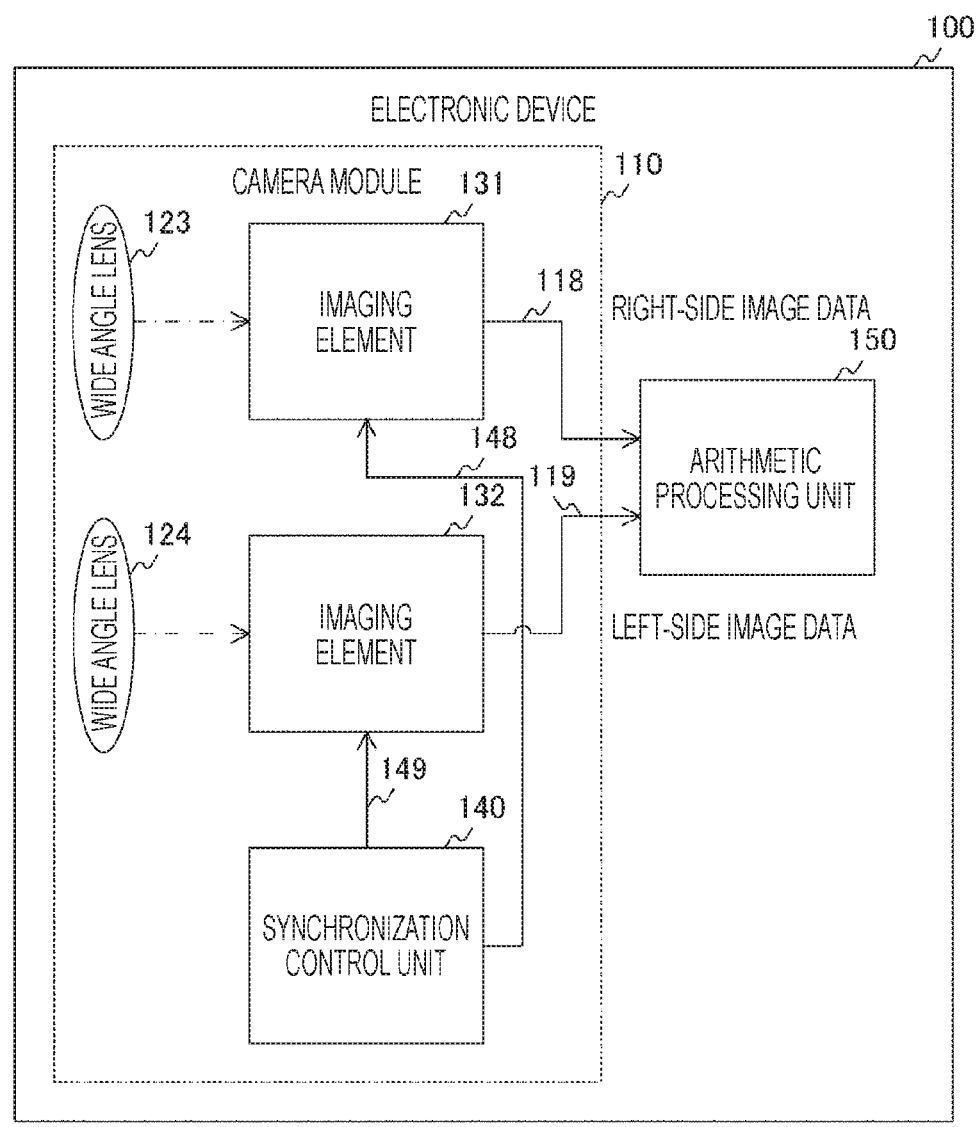
FIG. 11 is a block diagram illustrating a configuration example of an electronic device of a second variation of the first embodiment of the present technology.

FIG. 11 is a block diagram illustrating a configuration example of the electronic device 100 of a second variation of the first embodiment. The electronic device 100 of the second variation is different from the first embodiment in that wide angle lenses 123 and 124 are included instead of the standard lenses 121 and 122.

The wide angle lenses 123 and 124 have an angle of view larger than a certain value (e.g. 60 degrees).

Figure 12:
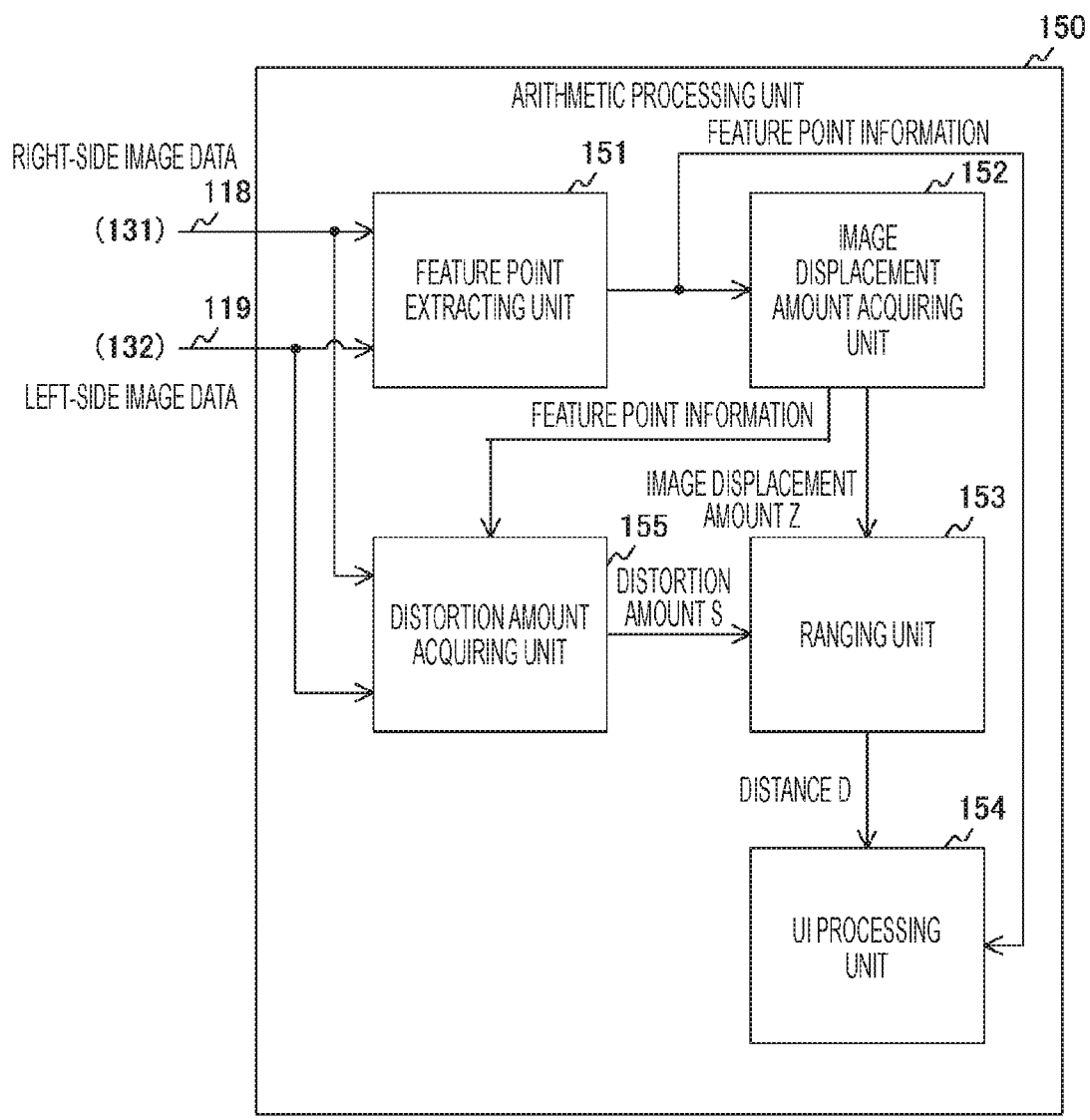
FIG. 12 is a block diagram illustrating a configuration example of an arithmetic processing unit of the second variation of the first embodiment of the present technology.

FIG. 12 is a block diagram illustrating a configuration example of an arithmetic processing unit 150 of the second variation of the first embodiment. The arithmetic processing unit 150 of the second variation is different from the first embodiment in that a distortion amount acquiring unit 155 is further included.

The distortion amount acquiring unit 155 acquires a distortion amount of one of left-side image data and right-side image data from the other. The distortion amount acquiring unit 155 receives feature point information including correspondence relationships of feature points from the image displacement amount acquiring unit 152 and receives left-side image data and right-side image data from the imaging elements 131 and 132. Then, the distortion amount acquiring unit 155 obtains a difference between a region of a certain shape (such as a circle) centered on one of a corresponding pair of feature points and a region of a certain shape centered at the other as a distortion amount S. A difference between the regions is represented by, for example, a sum of absolute values of differences between corresponding pixel values (sum of absolute differences (SAD)) or um of squared differences (SSD) of pixel values. The distortion amount acquiring unit 155 obtains the distortion amount S for each feature point and supplies the distortion amount S to the ranging unit 153.

Note that matching of feature points may be performed by the distortion amount acquiring unit 155, and correspondence relationships of the feature points may be notified to the image displacement amount acquiring unit 152. Alternatively, a circuit or a program for performing matching may be separated from the distortion amount acquiring unit 155 or the image displacement amount acquiring unit 152, and the circuit or other components may be shared by the distortion amount acquiring unit 155 and the image displacement amount acquiring unit 152.

Furthermore, the ranging unit 153 of the second variation measures the distance D from the image displacement amount Z and the distortion amount S. For example, the ranging unit 153 derives the distance Ds by a predetermined function that outputs a closer distance Ds for a larger distortion amount S, and derives a distance as Dz from the image displacement amount Z from the mathematical formula 2. Then, in a case where a difference between the distance Ds and the distance Dz exceeds a predetermined allowable value, the distance Ds is selected and supplied to the UI processing unit 154 as the distance D. On the other hand, win a case where the difference between the distance Ds and the distance Dz is within the allowable value, the ranging unit 153 supplies an average, a weighting additional value, or the like thereof to the UI processing unit 154 as the distance D.

Note that the ranging unit 153 measures the distance D from the image displacement amount Z and the distortion amount S, the distance D may be measured from only the distortion amount S.

Figure 13A:
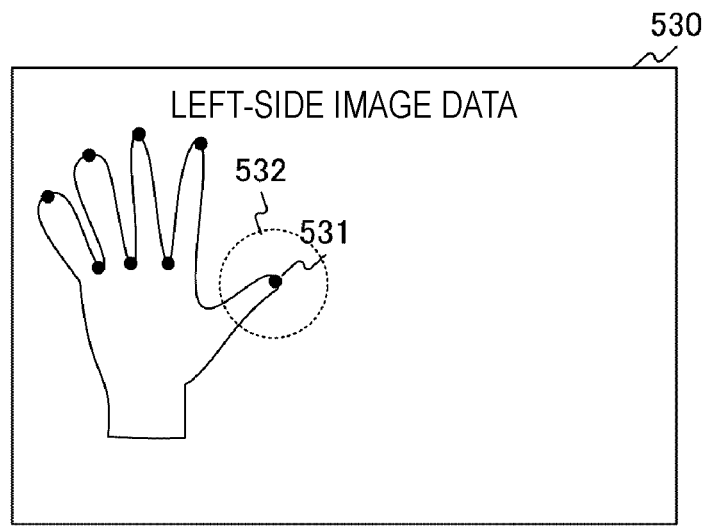
FIGS. 13a and 13b include diagrams illustrating an example of a left-side image data and a right-side image data of the second variation of the first embodiment of the present technology.
Figure 13B:
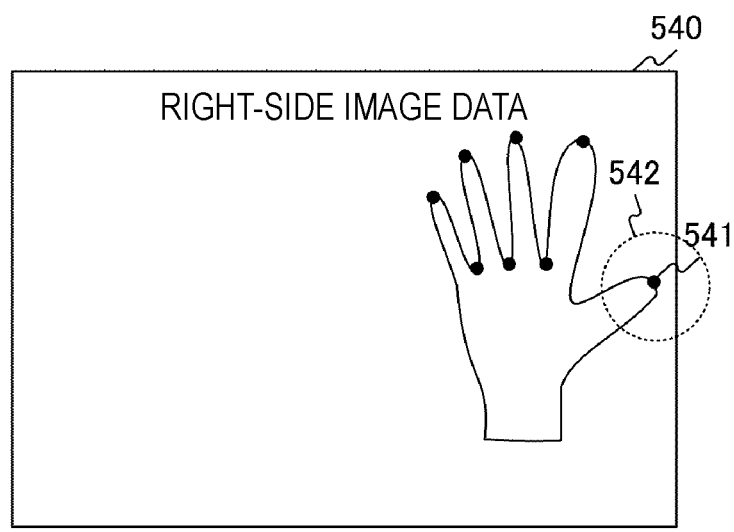

FIGS. 13a and 13b include diagrams illustrating an example of a left-side image data and a right-side image data of the second variation of the first embodiment. In the drawing, FIG. 13a is an example of left-side image data 530 in the second variation, and b in the figure is an example of right-side image data 540 in the second variation. A black point in the image data represents a feature point. Distortion occurs in each of a pair of image data as exemplified in FIGS. 13a and 13b, and the distortion amount is different for each piece of the image data.

The feature point extracting unit 151 extracts a feature point 531 and other points in the left-side image data 530 and extracts a feature point 541 and other points in the right-side image data 540. Then, the image displacement amount acquiring unit 152 performs matching of feature points. For example, the feature point 531 in the left-side image data is associated with the feature point 541 in the right-side image data.

Furthermore, the distortion amount acquiring unit 155 acquires a difference between a region 532 surrounding the feature point 531 and a region 542 surrounding the corresponding feature point 541 as the distortion amount S. A distance is obtained from the distortion amount S.

As described above, since the electronic device 100 measures the distance from the distortion amount of one of a pair of images from the other according to the second variation of the first embodiment of the present technology, the ranging accuracy can be improved.

2. Second Embodiment

In the first embodiment described above, since it is necessary to include a standard lens in each of the imaging elements 131 and 132, the number of parts of the optical system is increased as compared with a single lens configuration. An electronic device 100 of a second embodiment is different from the first embodiment in that an increase in the number of parts of an optical system is suppressed.

Figure 14:
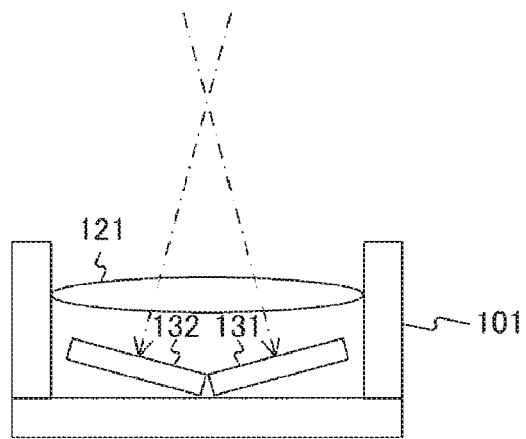
FIG. 14 is a top view illustrating a configuration example of an optical system of the second embodiment of the present technology.

FIG. 14 is a top view illustrating a configuration example of an optical system of the second embodiment. The optical system of the second embodiment is different from the first embodiment in that the lens barrel 102 and the standard lens 122 are not included.

Moreover, a standard lens 121 and imaging elements 131 and 132 are included in the lens barrel 101 in the second embodiment. Thus, the standard lens 121 is shared by the imaging elements 131 and 132, and both of these imaging elements receive light from the standard lens 121. The standard lens 121 is arranged such that a lens surface thereof is parallel to a bottom surface of the lens barrel 101, and the imaging elements 131 and 132 are arranged such that light receiving surfaces thereof are tilted with respect to the bottom surface of the lens barrel 101.

Note that, although the standard lens 121 and the imaging elements 131 and 132 are arranged in the same camera module 110, the standard lens 121 and the imaging elements 131 and 132 may be arranged in separate modules or units. For example, the standard lens 121 may be arranged in the lens unit, and the imaging elements 131 and 132 may be arranged in a camera module or a camera unit.

As described above, since only one standard lens is used according to the second embodiment of the present technology, the number of parts of the optical system can be reduced as compared with the configuration in which two standard lenses are included.

[Variations]

In the second embodiment described above, both of the imaging elements 131 and 132 are tilted with respect to the bottom surface of the lens barrel 101. However, for tilted arrangement, it is necessary to provide a support member or other members between the lens barrel 101 and the imaging element 131, which may disadvantageously increase the number of parts. Furthermore, there is a possibility that positional displacement may occur upon arrangement by tilting. An electronic device 100 of a first variation of the first embodiment is different from the first embodiment in that an increase in the number of parts of an optical system or positional displacement is suppressed.

Figure 15:
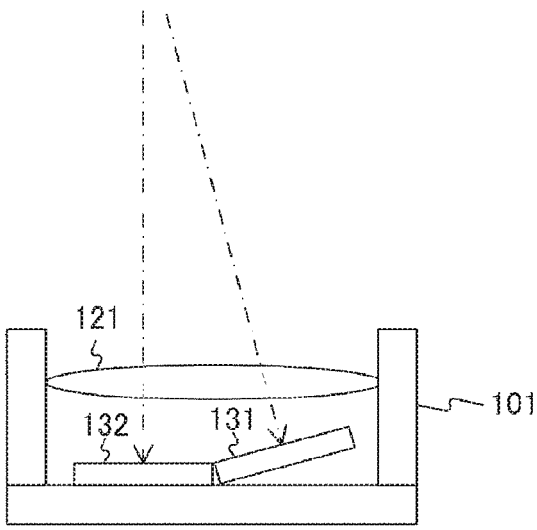
FIG. 15 is a top view illustrating a configuration example of an optical system of a variation of the second embodiment of the present technology.

FIG. 15 is a top view illustrating a configuration example of an optical system of a variation of the second embodiment. The optical system of the variation is different from the second embodiment in that the imaging element 132 is arranged such that the light receiving surface of the imaging element 132 is parallel to the bottom surface of the lens barrel 101. As a result, no support member is necessary for the imaging element 132, and thus an increase in the number of parts of the optical system can be suppressed. Moreover, occurrence of positional displacement of the imaging element 132 can be suppressed. Furthermore, the imaging element 132 arranged in parallel to the bottom surface of the lens barrel 101 can be used also as a main camera for capturing video or still images. For example, when a moving image or a still image is captured without performing ranging, it is enough to use only the imaging element 132.

As described above, since a light receiving surface of one of the pair of imaging elements is arranged so as to be parallel to the bottom surface of the lens barrel 101 according to the variation of the second embodiment of the present technology, an increase in the number of parts of the optical system or positional displacement can be suppressed.

3. Third Embodiment

In the first embodiment described above, the camera module 110 and the arithmetic processing unit 150 are arranged in the same device (electronic device 100); however, the camera module 110 and the arithmetic processing unit 150 may be arranged in separate devices in a distributed manner. A system of the third embodiment is different from the first embodiment in that the camera module is arranged in a separate device from that of an arithmetic processing unit. Note that an information processing system is an example of the image capture system described in the claims.

Figure 16:
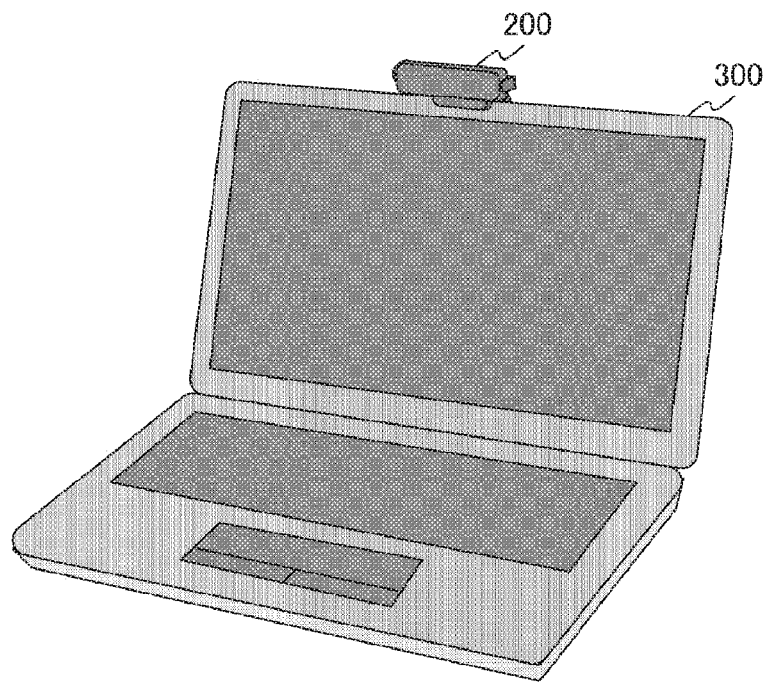
FIG. 16 is an example of an external view of an information processing system of a third embodiment of the present technology.

FIG. 16 is an example of an external view of the information processing system of the third embodiment. The information processing system includes a camera unit 200 and an information processing device 300. As the information processing device 300, for example, a personal computer of a laptop type or a desktop type is assumed.

Figure 17:
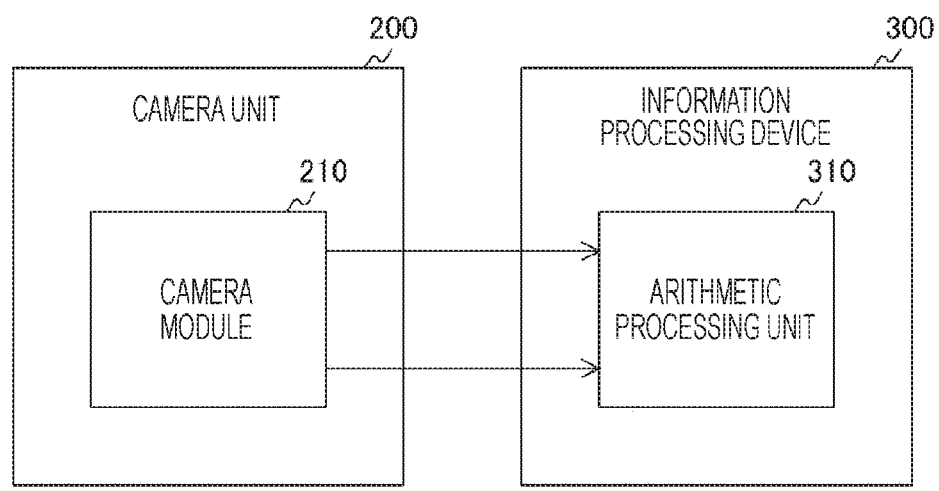
FIG. 17 is a block diagram illustrating a configuration example of the information processing system of the third embodiment of the present technology.

FIG. 17 is a block diagram illustrating a configuration example of the information processing system of the third embodiment. A camera module 210 is arranged in the camera unit 200, and an arithmetic processing unit 310 is arranged in the information processing device 300.

Figure 18:
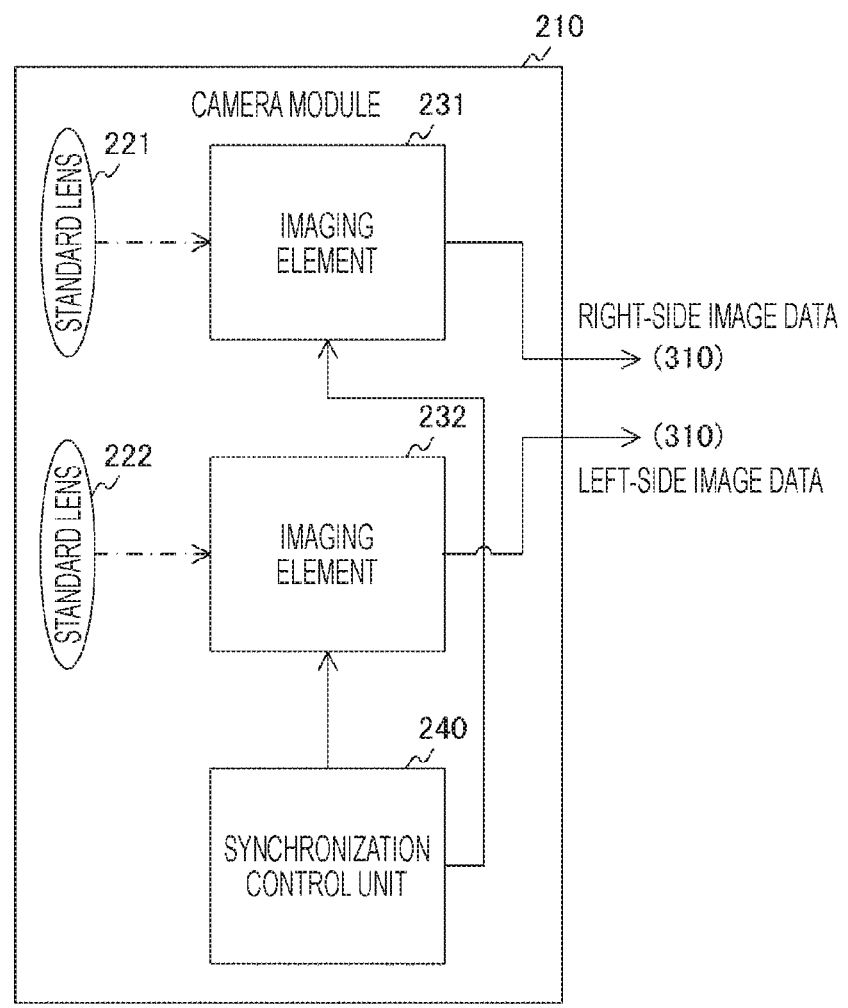
FIG. 18 is a block diagram illustrating a configuration example of a camera module of the third embodiment of the present technology.

FIG. 18 is a block diagram illustrating a configuration example of the camera module 210 of the third embodiment. The camera module 210 includes standard lenses 221 and 222, imaging elements 231 and 232, and a synchronization control unit 240. Configurations of the standard lenses 221 and 222, the imaging elements 231 and 232, and the synchronization control unit 240 are similar to those of the standard lenses 121 and 122, the imaging elements 131 and 132, and the synchronization control unit 140 of the first embodiment.

Figure 19:
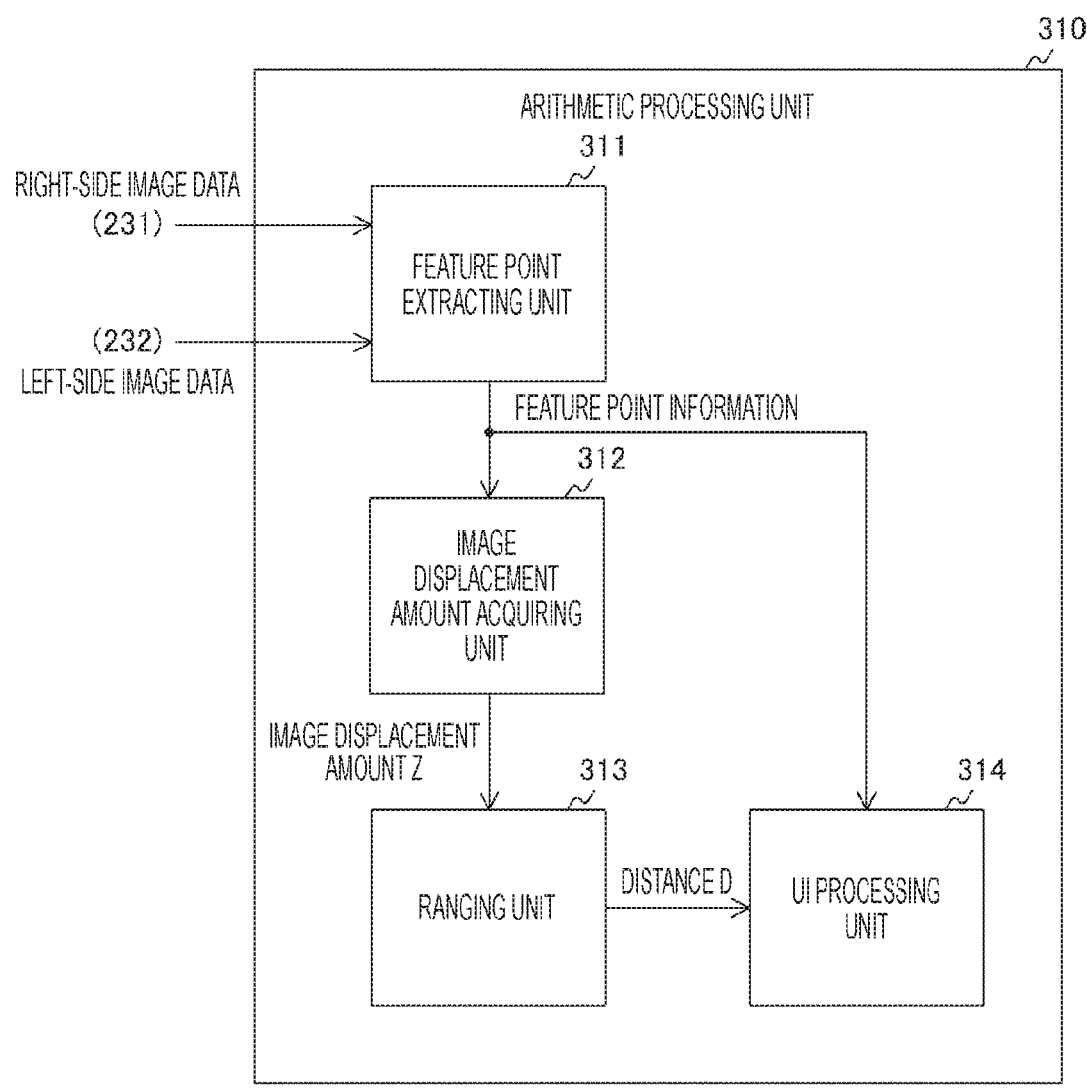
FIG. 19 is a block diagram illustrating a configuration example of an arithmetic processing unit of the third embodiment of the present technology.

FIG. 19 is a block diagram illustrating a configuration example of the arithmetic processing unit 310 of the third embodiment. The arithmetic processing unit 310 includes a feature point extracting unit 311, an image displacement amount acquiring unit 312, a ranging unit 313, and a UI processing unit 314. Configurations of the feature point extracting unit 311, the image displacement amount acquiring unit 312, the ranging unit 313, and the UI processing unit 314 similar to those of the feature point extracting unit 151, the image displacement amount acquiring unit 152, the ranging unit 153, and the UI processing unit 154 of the first embodiment. The functions of the feature point extracting unit 311, the image displacement amount acquiring unit 312, the ranging unit 313, and the UI processing unit 314 are implemented by a program, for example. As a result, even in the information processing device 300 not including the pair of imaging elements 131 and 132 in which the optical axes thereof cross, attaching the camera unit 200 and mounting a program allow ranging to be performed with high accuracy. Note that at least a part of the feature point extracting unit 311, the image displacement amount acquiring unit 312, the ranging unit 313, and the UI processing unit 314 may be implemented by a circuit but by a program.

As described above, since the camera module 210 is arranged in the camera unit 200 external to the information processing device 300 according to the third embodiment of the present technology, the ranging accuracy can be improved in the information processing device 300 not incorporating a pair of imaging elements in which the optical axes thereof cross. Moreover, since the base line length can be reduced without deteriorating the ranging accuracy, the camera unit 200 can be downsized.

[Variations]

In the third embodiment described above, the information processing device 300 performs the processing of measuring the distance, but a processing load of the information processing device 300 increases due to the processing. An information processing system of a variation of the third embodiment is different from the third embodiment in that a processing load of an information processing device 300 is reduced.

Figure 20:
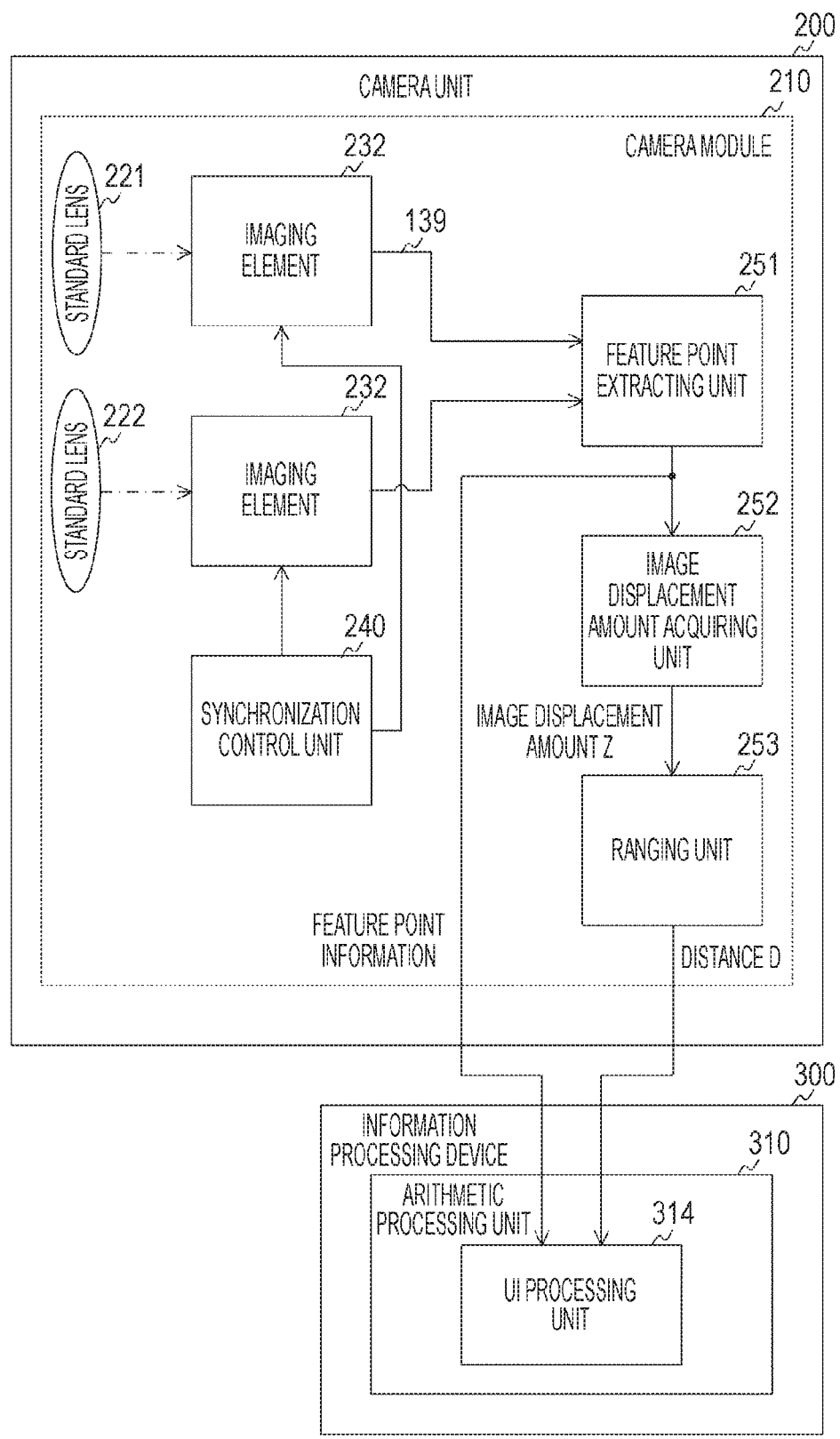
FIG. 20 is a block diagram illustrating a configuration example of an information processing system of a variation of the third embodiment of the present technology.

FIG. 20 is a block diagram illustrating a configuration example of the information processing system of the variation of the third embodiment. A camera unit 200 of the variation is different from the third embodiment in that a feature point extracting unit 251, an image displacement amount acquiring unit 252, and a ranging unit 253 are further included. The configurations of the feature point extracting unit 251, the image displacement amount acquiring unit 252 and the ranging unit 253 are similar to those of the feature point extracting unit 151, the image displacement amount acquiring unit 152, and the ranging unit 153 of the first embodiment.

Moreover, the information processing device 300 of the variation is different from the third embodiment in that the feature point extracting unit 311, the image displacement amount acquiring unit 312, and the ranging unit 313 are not included.

As described above, since the feature point extracting unit 251, the image displacement amount acquiring unit 252, and the ranging unit 253 are arranged in the camera unit 200, the information processing device 300 is not required to perform the processing of measuring a distance. As a result, a processing load of the information processing device 300 can be reduced.

Note that, although the feature point extracting unit 251, the image displacement amount acquiring unit 252, and the ranging unit 253 are arranged in the camera unit 200, only a part thereof may be arranged in the camera unit 200, and the rest may be arranged in the information processing device 300.

As described above, since the feature point extracting unit 251, the image displacement amount acquiring unit 252, and the ranging unit 253 are arranged in the camera unit 200 according to the third embodiment of the present technology, the information processing device 300 is not required to measure the distance, and thus a processing load thereof can be reduced.

Note that the embodiments described above illustrate an example for embodying the present technology, and matters of the embodiments and matters specifying the invention in the claims correspond with each other. Likewise, matters specifying the invention in the claims and matters of the embodiments of the present technology denoted by the same names as those thereof correspond with each other. However, the present technology is not limited to the embodiments, and can be embodied by applying various modifications to the embodiments without departing from the principles thereof.

In addition, the processing procedure described in the above embodiments may be regarded as a method having a series of the procedures, or as a program for causing a computer to execute a series of the procedures or as a recording medium for storing the program. As this recording medium, for example, a compact disc (CD), a mini disc (MD), a digital versatile disc (DVD), a memory card, a Blu-ray (registered trademark) disc, or the like may be used.

Note that effects described herein are not necessarily limited. Any one of the effects described in the present disclosure may be included.

Note that the present technology may employ configurations as follows.

(1) An image capture device, including:
a pair of imaging elements in which axes perpendicular to light receiving surfaces thereof cross each other; and
a ranging unit for measuring a distance to an object on the basis of a parallax obtained from a pair of images captured by the pair of imaging elements.

(2) The image capture device according to item (1), further including:
an imaging lens for condensing light and guiding the light to the pair of imaging elements.

(3) The image capture device according to item (1), further including:
a pair of imaging lenses,
in which one of the pair of imaging lenses condenses light and guides the light to one of the pair of imaging elements, and
the other one of the pair of imaging lenses condenses light and guides the light to the other one of the pair of imaging elements.

(4) The image capture device according to any one of items (1) to (3), further including:
a lens barrel,
in which the light receiving surface of one of the pair of imaging elements is parallel to a bottom surface of the lens barrel.

(5) The image capture device according to any one of items (1) to (4),
in which the ranging unit measures the distance from an image displacement amount between one of the pair of images and the other.

(6) The image capture device according to any one of items (1) to (5),
in which the ranging unit measures the distance from a distortion amount of one of the pair of images from the other.

(7) An image capture system, including:
a pair of imaging elements in which axes perpendicular to light receiving surfaces thereof cross each other;
a ranging unit for measuring a distance to an object on the basis of a parallax obtained from a pair of images captured by the pair of imaging elements; and
a processing unit for performing processing of recognizing a shape of the object on the basis of the measured distance and the pair of images.

REFERENCE SIGNS LIST

100 Electronic device
101, 102 Lens barrel
110, 210 Camera module
121, 122, 221, 222 Standard lens
123, 124 Wide angle lens
131, 132, 231, 232 Imaging element
140, 240 Synchronization control unit
150, 310 Arithmetic processing unit
151, 251, 311 Feature point extracting unit
152, 252, 312 Image displacement amount acquiring unit
153, 253, 313 Ranging unit
154, 314 UI processing unit
155 Distortion amount acquiring unit
200 Camera unit
300 Information processing device

The invention claimed is:

1. An image capture device, comprising:
a lens barrel;
an imaging lens, wherein a surface of the imaging lens is parallel to a bottom surface of the lens barrel;
a pair of imaging elements in which axes perpendicular to light receiving surfaces thereof cross each other, wherein
the pair of imaging elements is configured to capture a pair of images,
a light receiving surface of a first imaging element of the pair of imaging elements is parallel to the bottom surface of the lens barrel,
a light receiving surface of a second imaging element of the pair of imaging elements is inclined at an angle with respect to the bottom surface of the lens barrel; and
circuitry configured to:
extract at least one feature point in each image of the pair of images;
calculate an image displacement amount, wherein the calculated image displacement amount is a distance between corresponding feature points of the pair of images; and
measure a distance to an object based on a parallax obtained from the pair of images, wherein the parallax is based on the calculated image displacement amount.

2. The image capture device according to claim 1, wherein:
the imaging lens is configured to condense light and guide the light to the pair of imaging elements.

3. The image capture device according to claim 1, wherein the circuitry is further configured to measure the distance to the object from a distortion amount of the pair of images.

4. An image capture system, comprising:
a lens barrel;
an imaging lens, wherein a surface of the imaging lens is parallel to a bottom surface of the lens barrel;
a pair of imaging elements in which axes perpendicular to light receiving surfaces thereof cross each other, wherein
the pair of imaging elements is configured to capture a pair of images
a light receiving surface of a first imaging element of the pair of imaging elements is parallel to the bottom surface of the lens barrel,
a light receiving surface of a second imaging element of the pair of imaging elements is inclined at an angle with respect to the bottom surface of the lens barrel; and
circuitry configured to:
extract at least one feature point in each image of the pair of images;
calculate an image displacement amount, wherein the calculated image displacement amount is a distance between corresponding feature points of the pair of images;
measure a distance to an object based on a parallax obtained from the pair of images, wherein the parallax is based on the calculated image displacement amount; and
perform recognition of a shape of the object based on the measured distance and a distortion amount between the pair of images.

* * * * *